United States Patent [19]

Clark

[11] Patent Number: 4,488,970

[45] Date of Patent: Dec. 18, 1984

[54] DIESEL FUEL MONITOR SYSTEM, NEGATIVE PRESSURE TYPE

[76] Inventor: Joseph H. Clark, 4015 Woodley Rd., Ellicott City, Md. 21043

[21] Appl. No.: 311,393

[22] Filed: Oct. 14, 1981

[51] Int. Cl.³ .......................... B03D 3/00; G08B 21/00
[52] U.S. Cl. ...................................... 210/746; 210/86; 210/96.1; 210/114; 340/59; 340/620
[58] Field of Search ...................... 210/744, 746, 96.1, 210/86, 97, 112, 114, 115, 416.4, 416.5; 340/59, 620

[56] References Cited

U.S. PATENT DOCUMENTS

| | | | |
|---|---|---|---|
| 2,348,757 | 5/1944 | Samiran | 210/115 |
| 2,984,360 | 5/1961 | Smith | 210/114 X |
| 4,227,173 | 10/1980 | Clark | 340/59 |
| 4,264,442 | 4/1981 | Jackson | 210/114 |

Primary Examiner—John Adee
Attorney, Agent, or Firm—Walter G. Finch

[57] ABSTRACT

An improved negative pressure type diesel fuel monitor system that determines a specified level of water trapped in a component of the system and disposed of said water, said water having been separated from the fuel being pumped in the engine fuel line hookup. The system consists of a device to monitor the accumulated water level as it rises in the device, said device also being the facility for separating said water from said fuel and for disposing of said water, said system includes an electrical wiring circuit, connected to the engine run circuit, to operate said device and including a motorized valve to eject collected water therein, a set of logic circuits as part of said electrical wiring circuit, and a combined visual and audio monitor console to record current status of operation of said system.

11 Claims, 9 Drawing Figures

DIESEL FUEL MONITOR SYSTEM, NEGATIVE PRESSURE TYPE

BACKGROUND AND SUMMARY OF THE INVENTION

The invention relates to fuel systems and particularly to diesel fuel systems, specifically to systems which separate, monitor, and dispose of water in such diesel fuel systems. More specifically, the invention relates to negative pressure or vacuum pipe diesel fuel systems for diesel engines in trucks, busses, boats, construction equipment, and all other uses of diesel engines, both mobile and stationary.

This invention is an improvement of the prior art Diesel Fuel Monitor System in U.S. Pat. No. 4,227,173, issued Oct. 7, 1980, and invented by the present applicant, Joseph H. Clark, said prior art invention operates only on pressure type systems where the fuel is forced through the contaminate separator device and will not eject water collected in the device when the fuel system induces the fuel into the engine system by suction or vacuum type means. The present invention overcomes this problem.

Water accumulates in diesel fuel storage tanks as well as in diesel fuel operating tanks on trucks, busses, boats, construction equipment, and all other uses of diesel engines, both in mobile uses and stationary uses. The water accumulates from rain that leaks into the tanks, ground seepage into tanks, condensation in tanks from moist air, and from other similar causes. It is to be noted that diesel fuel is specified herein, but any type of automotive engine fuel is included within the scope and intent of this invention.

When sufficient water reaches the engine parts that are critical in the engine operation the engine stops. In addition, in cold weather in winter or in areas that are habitually cold, the water in these critical engine parts, particularly in the engine mechanisms, such as the injector, the water freezes and prolongs the down-time of the engine. In these latter cases the mechanisms are often damaged by cracking or breaking the parts.

In regard to the above, it is important in completing the mission of the engine that it continue to operate, or be able to operate at a moments notice. Such completion of a mission might be the reaching of a destination by a truck or bus, reaching of a port by a boat or ship, keeping an emergency generating system generating electricity, the ability of an engine to start on command in a hostile environment, and other such situations.

A system of this type of the prior art is normally intended for inserting in the fuel line between the fuel pump of the system and the primary filter of the system. Such a system normally can be inserted after a regular mechanically operated pump or after an electrically operated pump. It should be understood that a pump operated by other means is within the scope and intent of this invention. However, such arrangements will not operate when the fuel is induced into the system by suction or by a vacuum or negative pressure. In such cases the system must be inserted before the suction or vacuum-type pumping means and normally before the primary filter of the system. The fuel is thus sucked or induced into and through the contaminate separator device. The details are discussed hereinafter.

Included in the system is a sensing unit in a device of the system that senses the level of the water which has been trapped in the device and disposes of it.

A test system can be set up to test the invented system by having both a water line and diesel fuel line connected from a water supply and a diesel fuel supply, respectively, to a pump which delivers water and/or diesel fuel to the inlet of the invented system. Valves in each of the two supply lines (water and diesel fuel supply lines) permit selectivity controlling a supply of water and/or diesel fuel to the pump. Thus a supply of water and/or diesel fuel may be varied in a zero quantity of either or any percentage of either to make up a 100% total of the mixture supplied, such as 1% and 99%, 50% and 50%, 99% and 1%, and other combinations.

In the system an alternating current (AC) is used across the terminals of the sensing unit instead of a direct current (DC). The reason AC is used instead of DC is because a DC flow of electrical energy will very quickly build up a deposit of insulating matter on one of the two terminals, whereas the use of an AC current keeps the terminals clean. The buildup of insulating matter on one of the two terminals by the direct current in due time, a relatively short time, soon stops the operation of the system. The use of an alternating current prevents such a problem by keeping both terminals of the sensing unit uncontaminated.

The AC is provided by a transformer in a set of logic circuits of the system.

In the prior art, when the level of collected water in the system triggers the discharge action, the pressure in the system forces the collected water out through a discharge outlet (a solenoid operated valve). In suction or vacuum-type fuel supply systems, if arranged as in the prior art, air would be sucked in through the solenoid valve instead of pumping out the collected water. The present invention overcomes this.

The system can be set up to operate in a 12 volt or a 24 volt system, or modified for any other type voltage system. The device involved is essentially the same in either case.

The important feature of this system is that it disposes of the water at frequent intervals as the monitor senses the level of the water at a critical point for disposal and automatically disposes it. Previously, in the prior art prior to the cited U.S. Pat. No. 4,227,173, the engine would stop and the water had to be drained manually from the low-point where it was accumulated. The present invention provides automatic disposal when the fuel system operates by suction or vacuum-type or negative pressure means.

It is to be noted that water has been specified as the contaminate, but it is to be understood that any electrically conductive contaminate is within the scope and intent of this invention.

This system does not replace the normal fuel filter, the system normally is inserted ahead of the filter.

It is, therefore, an object of this invention to provide a diesel fuel monitor system to monitor the diesel fuel for any water content therein.

It is another object of this invention to provide a diesel fuel monitor system that automatically disposes of water separated from the diesel fuel.

It is still another object of this invention to provide a diesel fuel monitor system that operates a sensing system that operates on alternating current to keep the sensing terminals clean of insulating contaminating matter.

It is yet another object of this invention to provide a diesel fuel monitor system that has visual and audible alarm components which provide the status of the system in operation.

Further objects and advantages of the invention will become more apparent in the light of the following description of the preferred embodiments.

DESCRIPTION OF THE PREFERRED EMBODIMENTS

Figure 9:
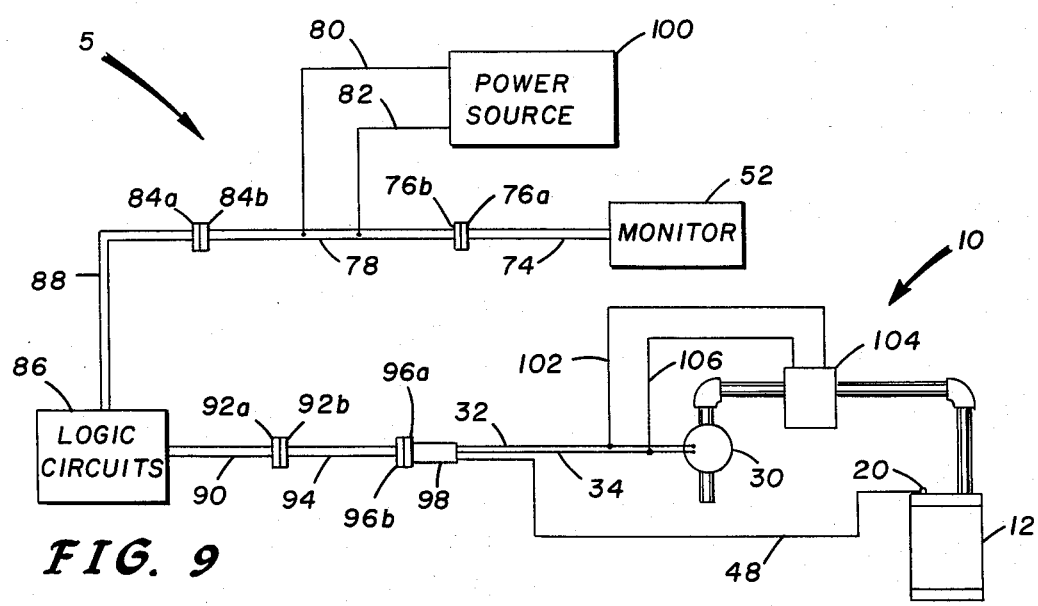
FIG. 9 is a schematic diagram of a layout of the components of a negative pressure type diesel fuel monitor system.

Referring to the drawings and particularly to FIG. 9, a negative pressure type diesel fuel monitor system is shown at 5.

Figure 1:
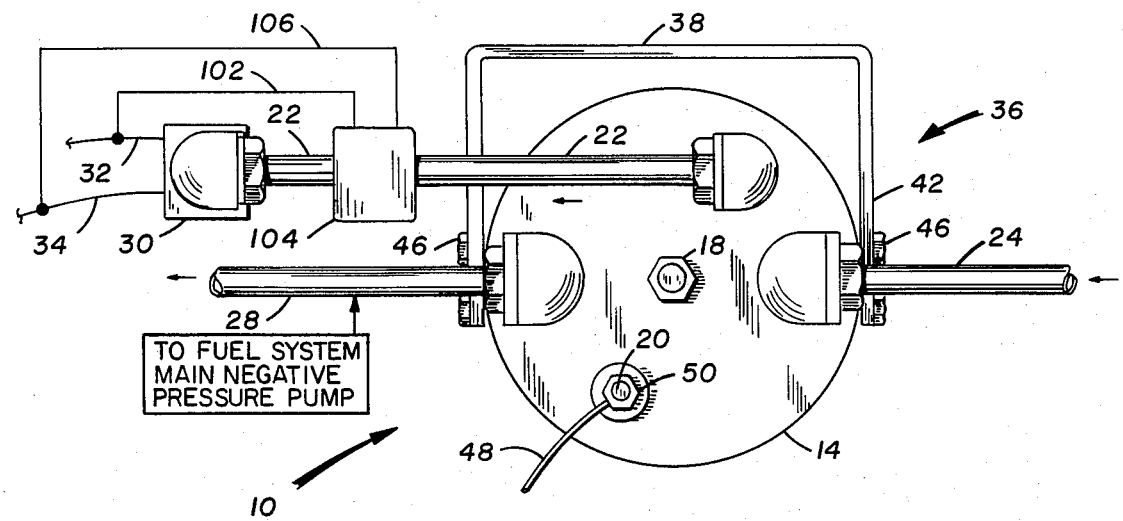
FIG. 1 is a top plan view of a water separating and disposal device of a negative pressure type diesel fuel monitor system.
Figure 2:
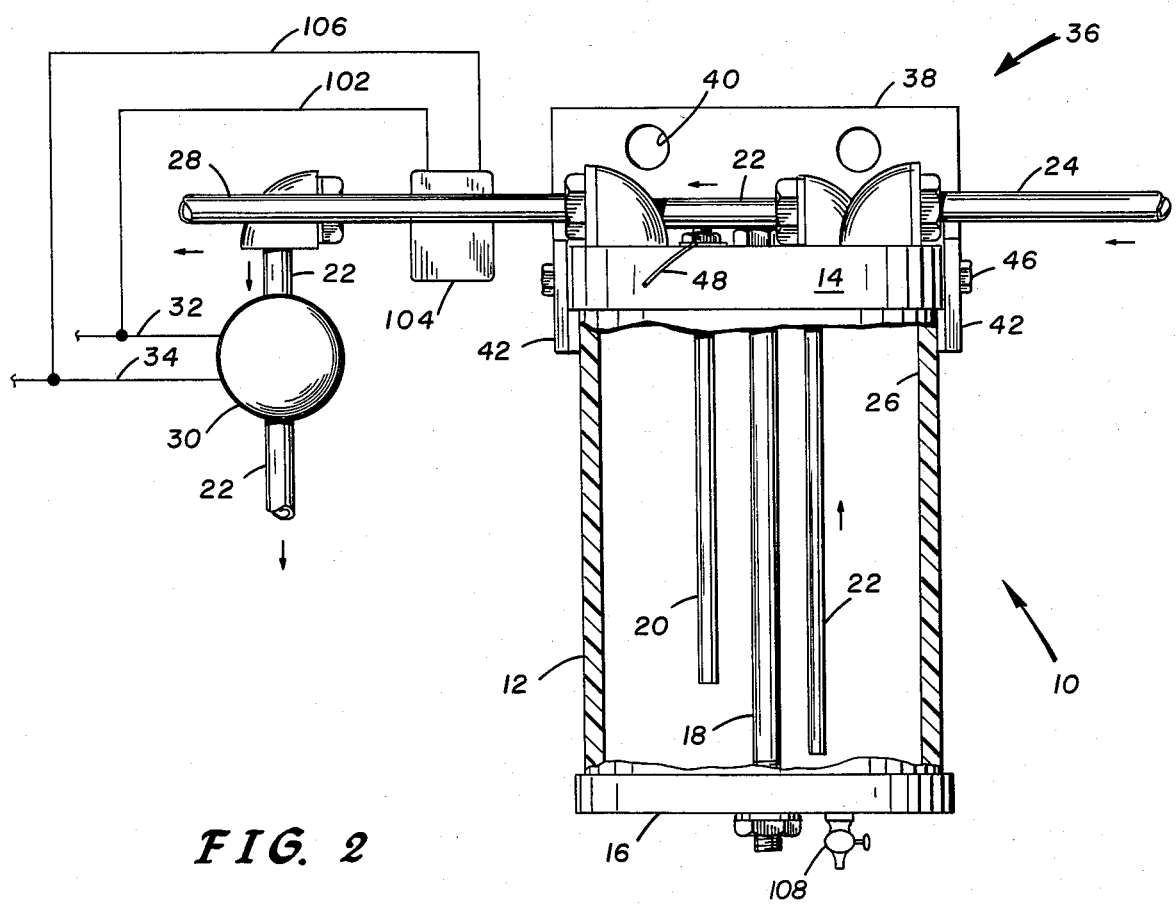
FIG. 2 is a side view in partial section of FIG. 1.

In FIGS. 1 and 2, the water separating and disposal device of a negative pressure type diesel fuel monitor system is shown at 10.

Referring to FIG. 9, the major components which make up the negative pressure type diesel fuel monitor system 5 are: the water separating and disposal device 10; a logics circuitry unit 86; a control console monitor 52; an electrical harness 94 to connect the water separating and disposal device 10 to the logics circuitry unit 86; and an electrical harness 78 to connect the logics circuitry unit 86 to the control monitor 52, and with further connections of the negative pressure type diesel fuel monitor system 5 to the power source 100 of the engine run circuit. The engine run circuit includes the fuel pump in the engine run circuit. Details of the aforementioned major components will be described hereinafter.

Turning now to the water separating and disposal device 10 shown in FIGS. 1 and 2, the diesel fuel, hereinafter called fuel, induced by the main fuel pump, noted in FIG. 1 enters the water separating and disposal device 10 through inlet 24 and exits the water separating and disposal device 10 through outlet 28. As the fuel enters inlet 24 it may be contaminated with water. As the fuel leaves outlet 28 it is relatively uncontaminated with water.

Figure 7:
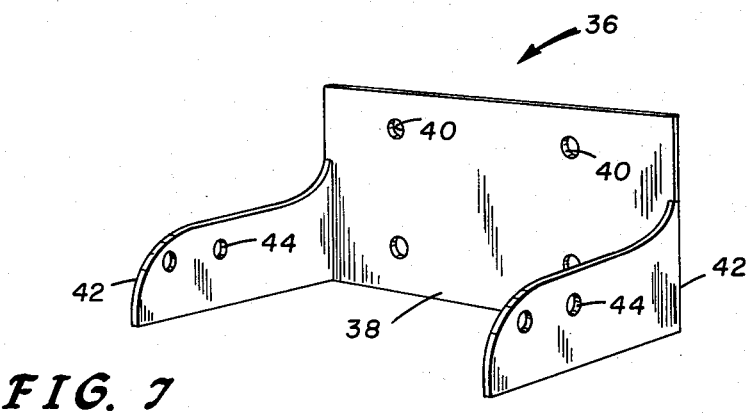
FIG. 7 is a perspective view of a reversible mounting bracket for mounting a water separating and disposal device of a vacuum type diesel fuel monitor system.

The water separating and disposal device 10 is mounted to a suitable support by a reversible mounting bracket 36, which is shown in detail in FIG. 7. As shown in FIGS 1 and 2, the bracket 36 is shown on a first side of the water separating and disposal device 10 hereinafter called device 10, mounted to the device 10 by the two side arms 42 by means of bolts or machine screws 46 through holes 44 in the side arms 42 and into the top 14 of the device 10. Depending on the location of a selected place for mounting the device 10 and the arrangement of piping and other aspects of the layout, the bracket 36 may be mounted on a second side of device 10 which is opposite to the said first side of device 10. This reversal of position of the bracket 36 might also be referred to as right and left handed mounting. The suitable support to which device 10 is mounted by bracket 36 may be on the engine proper or on an associated structure, such as a truck body, boat bulkhead, or other similar and convenient support. The bracket 36 is mounted to the aforementioned support (not shown) by screws, bolts, or other suitable means (not shown) through holes 40 in the back 38 of bracket 36.

As the fuel enters the inlet 24, it flows downward through the elbow connection (not numbered) on the inlet 24 into the interior of the housing 12 of the device 10. The fuel then flows more or less horizontally across the interior 26 of the housing 12, and then generally upward and out through the elbow connection (not numbered) leading to the outlet 28.

Any water in the fuel as it enters the interior of the housing 12, falls to the bottom 16 of the interior 26 of housing 12 and accumulates on the bottom 16 of the device 10.

The housing 12 may be glass, metal, plastics or any other similar and equivalent material. Metal has the disadvantage that the contents cannot be readily observed, whereas a clear glass or transparent plastics affords excellent opportunity for observing the fuel oil passing through the device 10 and the water accumulated in the housing 12.

The top 14, housing 12, and bottom 16 of device 10 are shown removably clamped together and held securely in place by a connecting bolt and nut 18 with suitable gaskets (not shown) to prevent leakage of oil and/or water from the interior 26 of the housing 12, with the top 14 and bottom 16 clamped in place by the connecting bolt and nut 18.

It is to be noted that the top 14 and the bottom 16 may be gasketed screw-type parts to removably connect to the housing 12 instead using a bolt and nut 18. Such a variation is within the scope and intent of this invention.

A small valve or petcock 108 may be installed in the bottom 16 in order to drain accumulated water in cold weather, when the engine is not in operation, and it is necessary to prevent freezing when the engine is idle. That is, water that may be sufficient to initiate the disposal action of the device 10 before the engine is shut down.

When water accumulates in the lower portion of the housing 12 up to a level so that the water reaches the electrode 20, which is spaced from the bottom 16, a circuit is completed through the water from the electrode 20 to either or both of the bolt 18 or the discharge pipe 22.

The electrode 20 is insulated under the nut 50 from the top 14. The insulator (not numbered) is shown in FIGS. 1 and 2 under the nut 50 and it extends into the top 14 to provide the insulation between the electrode 20 and the top 14 where the electrode 20 passes through the top 14.

The bolt 18 and the discharge pipe 22 have a direct connection to the top 14 and are grounded through the top 14 and its bracket 36 which is suitably grounded by the mounting structure.

The electrode 20, insulated from the top 14, is electrically connected to a power source through the electrical lead 48. The electrical lead 48 is incorporated into the wiring of the pigtail electrical harness 98 shown in FIG. 9.

Thus the electrical circuit, at the detection of water in the housing 12, is completed through the electrical lead 48 from the pigtail electrical harness 98 to the electrode 20 through the accumulated water in the housing 20, which has reached the electrode 20, to either or both of the grounded bolt 18 and/or the grounded discharge pipe 22. The discharge pipe 22 is spaced from the bottom 16 a lesser distance than the electrode 20 is spaced from the bottom 16.

When the electrical circuit is completed through the accumulated water as aforementioned, a signal is sent through the wiring system, lead 48 through the pigtail electrical harness 98, through the electrical harness 94, and through the pigtail electrical harness 90 to the logic circuits 86. The logic circuits 86 relay a signal back through the aforesaid electrical harnesses 90, 94, and 98 and thence through lead wire 32 to the solenoid valve 30. which opens the valve. The circuit being completed therefrom through ground wire 34 via the reference harnesses. At the same time the logic circuits 86 relay the signal back through the aforesaid lead wire 32 to the solenoid valve 30 it concurrently relays the signal through lead wire 102 to disposal suction or negative pressure pump 104 to suck or withdraw the water in housing 12. This latter circuit is completed through lead wire 106 to ground wire 34.

When the solenoid valve 30 opens and the disposal suction pump 104 starts, the fuel and accumulated water in housing 12, being sucked or withdrawn by the disposal suction or negative pressure pump 104 operation, is drawn up the vertical discharge pipe 22 within the housing 12, then through the horizontal portion of discharge pipe 22, shown in FIGS. 1 and 2 on the exterior of the disposal top 14, then through the suction or negative pressure pump 104, and then vertically downward through the exterior discharge pipe 22, through the open solenoid valve 30, and is discharged to a suitable receiving means (not shown) for later disposal under proper environmental conditions.

When a sufficient amount of accumulated water is discharged to lower the level of the water below the electrode 20, the circuit is broken and the disposal suction or negative pressure pump 104 stops and the solenoid valve disposal is closed.

As aforementioned, the water detection circuit is powered by an alternating current (AC). The AC is obtained from a transformer in the logic circuits 86, the AC being routed to the electrode 20 via the aforementioned electrical harnesses 90, 94, and 98.

Direction of flow into the fuel inlet 24 and out of the outlet 28 is shown by arrows in FIGS. 1 and 2. In a like manner, the direction of flow of the discharged water is shown by arrows at the discharge pipe 22 in FIGS. 1 and 2.

At the same time as the logic circuits 86 signal the solenoid valve 30 to open and the disposal suction pump 104 to operate, a signal is also sent via pigtail electrical harness 88, through electrical harness 78, through pigtail electrical harness 74, to the control console monitor 52, to light the red alarm or visual indicator lamp 60 to notify the operator that the device 10 is operating to discharge accummulated water. Concurrently, an audible alarm or indicator 62 is sounded when the discharge of accumulated water is taking place. A switch on the front panel of the control console monitor 52 may be used to turn off the sounding audible alarm. The operations of the control console monitor 52 is, in effect, a readout means to indicate the status of the fuel monitoring system.

The front panel of the control console monitor 52 also has a fuse 56 to protect the circuitry, and a green operating light 54 to indicate when the circuits are alive and operational. It indicates when power is on and when operation can be checked. A push button 58 is available to test the circuits and the discharge operation. The push button overrides the circuit through the water and permits manually controlled operation of the solenoid valve 30 and the disposal suction pump 104, to test/check the operation and to discharge accumulated water in the housing 12, when there is insufficient water to automatically operate the solenoid valve 30 and suction pump 104.

Figure 3:
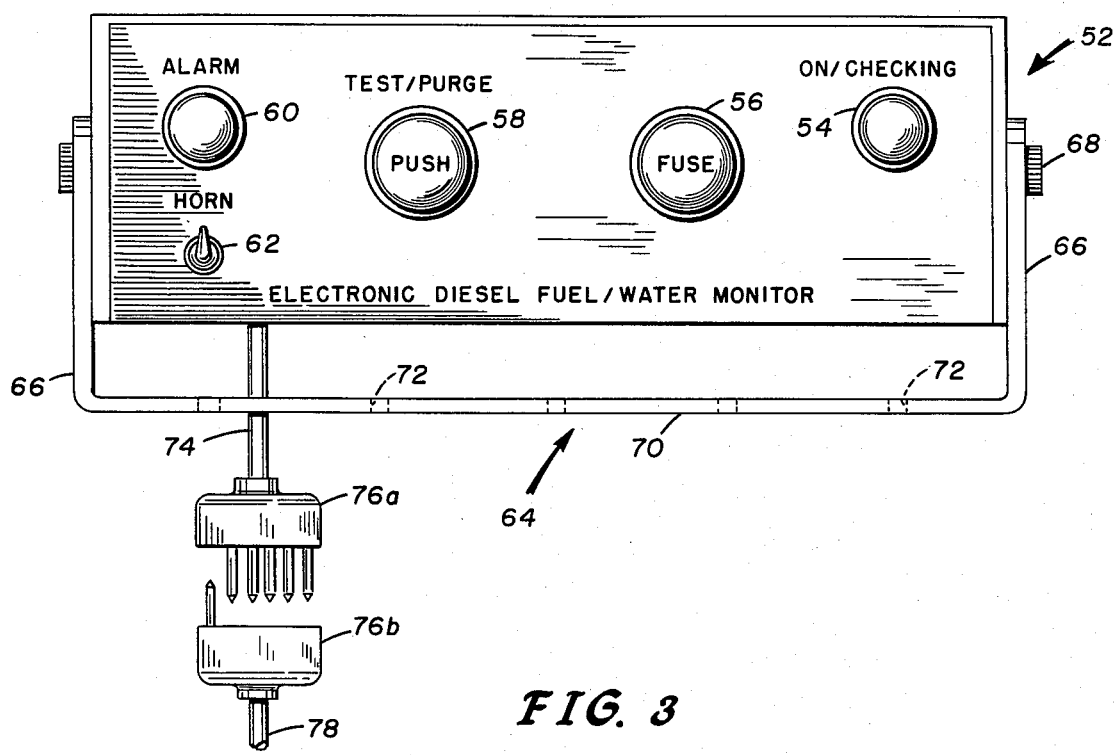
FIG. 3 is a front view of a control console monitor of a negative pressure type diesel fuel monitor system.
Figure 4:
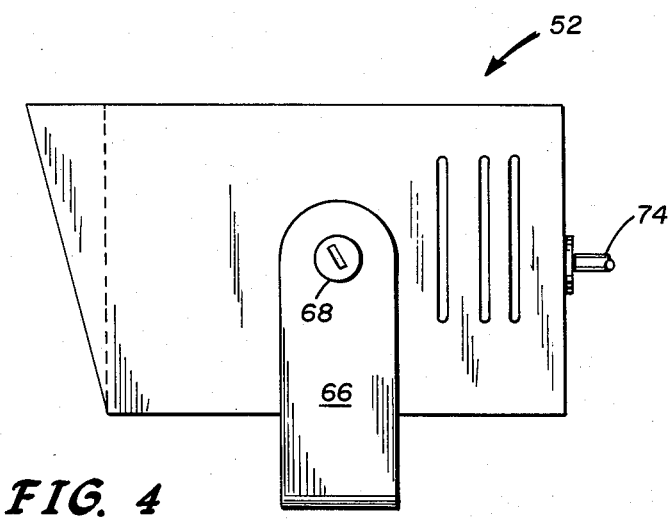
FIG. 4 is an end view of FIG. 3.

The control console monitor 52 has a mounting bracket 64 attached to it that is more or less "U" shaped. The sides 66 of the bracket 64 are arranged so that a pin, stud, or bolt 68 is inserted through the end areas of the bracket 64 to attach or affix it pivotally to the conntrol console monitor 52 so that the console 52 may be positioned in a plurality of positions for viewing. The bracket 64 may also thus be pivotably arranged to be at the bottom side of the control console monitor 52, as shown in FIGS. 3 and 4, or pivotably arranged to be on the top side or rear side of the control console monitor 52.

When the bracket 64 is at the bottom side of the control console monitor 52, as hereinbefore mentioned, it can be mounted on a suitable top surface, such as a dash board top side or similar shelf-like surface. When the bracket 64 is at the top side of the control console monitor 52, as hereinbefore mentioned, it can be mounted on a suitable underside surface, such as under a dash board or similar over-hang area. Being pivotably attached, the bracket 64 can also be arranged toward the back of the control console monitor 52, as hereinbefore mentioned, and mounted on a wall or other vertical surface as might be available in stationary type installations.

The "U" shaped bracket 64 has holes 72 in the bottom portion 70 of the "U" for suitable mounting means to attach it to a surface as hereinbefore described.

The control console monitor 52 has a pigtail electrical harness 74 extending from it for connecting it to the electrical harness 78 as shown in FIG. 9.

The logic circuits 86 are contained in a separate unit which may be suitably mounted in and/or on a vehicle, boat, location of a stationary engine, or similar situation or condition. The logic circuits 86 have two pigtail electrical harnesses 88 and 90 extending therefrom. The pigtail electrical harness 88 is connected to the electrical harness 78 and the pigtail electrical harness 90 is attached to the electrical harness 94 all as sown in FIG. 9.

Figure 5:
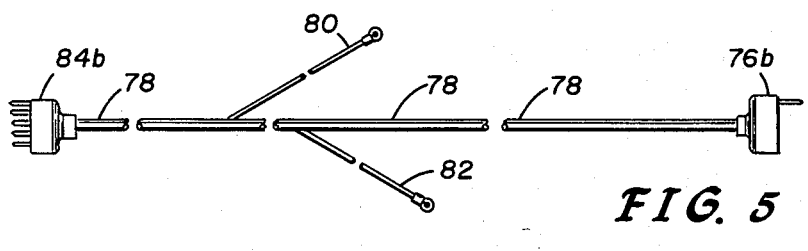
FIG. 5 is a top plan view of an electrical wiring harness for connecting a logic circuits component to a control console monitor component of a negative pressure type diesel fuel monitor system.
Figure 6:
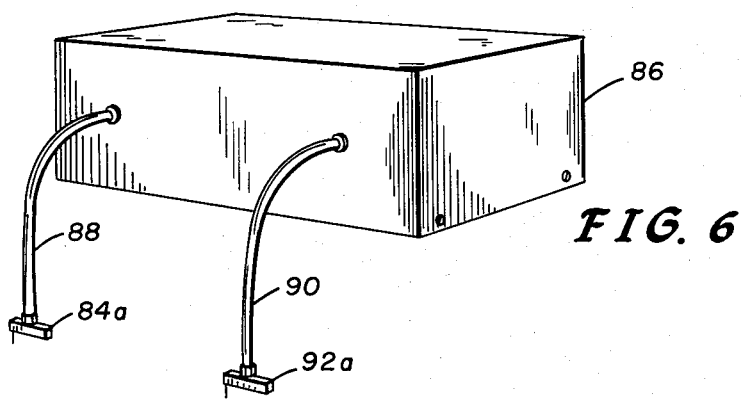
FIG. 6 is a perspective view of a case containing logic circuits of a negative pressure type diesel fuel monitor system.
Figure 8:
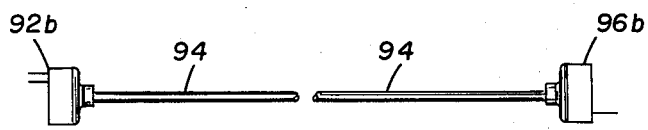
FIG. 8 is a top plan view of an electrical wiring harness for connecting a logic circuits component to the electrical connections of a water separating and disposal device of a negative pressure type diesel fuel monitor system.

The electrical harnesses aforementioned all have mating electrical plug connectors for making the electrical connections as hereinbefore described. Each pin and its mating socket of the mating electrical plus connectors provides for a continuity of the electrical circuit concerned. Those mating electrical plug connectors are: pigtail electrical harness 74 on the control console monitor 52 has a plug connector 76a to mate with the plug connector 76b on electrical harness 78, as shown in FIGS. 3, 5, and 9; pigtail electrical harness 88 on the logic circuits 86 has plug connector 84a to mate with plug connector 84b on electrical harness 78, as shown in FIGS. 5, 6, and 9; pigtail electrical harness 90 on logic circuits 86 has plug connector 92a to mate with plug connector 92b on electrical harness 94, as shown in FIGS. 6, 8, and 9; and pigtail electrical harness 98 attached to the electrode 20 by lead 48 and to the solenoid valve 30 by leads 32 and 34 and concurrently to the disposal suction pump 104 by leads 102 and 106, all said leads being electrical leads from said electrical harness 98, has plug connector 96a to mate with plug connector 96b on electrical harness 94, as shown in FIGS. 8 and 9. Said mating plug connectors each having mating pin or pole and socket combinations to complete each of the individual circuits.

The electrical harness 78 also has two leads 80 and 82 extending from it to connect to the power source 100 in the engine run circuit. The power source designation 100 also includes the operation of the main suction or negative pressure type fuel pump, noted in FIG. 1, which induces and supplies fuel (pure or contaminated with water) from the operating fuel tank (not shown) to the inlet 24 to the device 12 as hereinbefore specified. The leads 80 and 82 extending from electrical harness 78 and connecting to the power source 100 are shown in FIGS. 5 and 9.

It is to be noted that all the aforesaid connector plugs are multi-pole and associated socket types to provide continuity of wiring from, to, and between the respective terminals of the structural parts and entities, as hereinbefore described and specified, so as to provide electrical wiring circuits interconnecting said structural parts and entities for electrical operation as specified.

As can be readily understood from the foregoing description of the invention, the present structure can be configured in different modes to provide the ability to separate contaminates from fuel in negative pressure type fuel systems.

Accordingly, modifications and variations to which the invention is susceptible may be practiced without departing from the scope and intent of the appended claims.

What is claimed is:

1. A method for separating, detecting and automatically disposing of an electrically conductive contaminate in the fuel of negative pressure type automotive type fuel systems, comprising, passing said fuel through a separating mechanism to separate said contaminate and accumulate said contaminate at a specified point and location, sensing said fuel and contaminate under negative pressure, passing an electrical current through said contaminate between at least two terminals to complete a circuit, the completion of said circuit causing a valve to open and a negative pressure type pump to operate, whereby said pump sucks said accumulated contaminate through discharge means and directs said contaminate to a point of disposal.

2. A fuel monitor system for separating, detecting, and automatically disposing of electrically conductive contaminates in the fuel of negative pressure types automotive type fuel systems, comprising:

a negative pressure type fuel supply means, said negative pressure type fuel supply means having a fuel line, said fuel line containing contaminated fuel;

a separating means, said separating means being inserted, located, and affixed in said fuel line of said negative pressure type fuel supply means, said separating means separating and accumulating said contaminates in said fuel;

a sensing means, said sensing means being mounted and affixed within said separating means, said sensing means detecting the presence of said contaminates;

a means for maintaining a negative pressure, said means for maintaining said negative pressure being a part of said negative pressure type fuel supply means, said means for maintaining said negative pressure being located in and affixed and connected to said fuel line;

an electrical circuit system, said electrical circuit system being connected to said sensing means and to the power source of said automotive fuel system, said electrical circuit system controling the operation and providing a charge to said sensing means;

a readout means, said readout means being connected to said electrical circuit system, said readout means signaling the status of said fuel monitoring system; and a suction type disposal means, said disposal means being connected and affixed to said separating means and further connected to said electrical circuit system, said disposal means being operated when said sensing means detects said contaminate in said fuel, said disposal means causing the discharge of said accumulation of said contaminates.

3. The fuel monitoring system as recited in claim 2, wherein said separating means consists of a hollow cylindrical body means, said hollow cylindrical body means being open at each end, said cylindrical body means having both a top and bottom closure structure suitably sealed and attached to said body means, said top closure structure having a plurality of apertures therein for connection of an inlet means to a first aperture, said inlet means being for admission of said fuel with said contaminates therein, and for connection of an outlet means to a second aperture, said outlet means being for discharge of said fuel after said contaminates are separated therefrom, said contaminates being accumulated within said body means, said inlet and outlet means communicating with the hollow interior of said body means through said first and second said apertures in said top closure structure.

4. The fuel monitoring system as recited in claim 3, wherein said sensing means consists of an electrical conductor means, said electrical conductor means being inserted through a third aperture in said top closure structure and being insulated therefrom, said electrical conductor means extending downward into said hollow interior of said body means and spaced from said bottom closure structure, and a first hollow tubular pipe means connected by affixing to said top closure structure and passing therethrough through a fourth aperture to communicate with the exterior thereof, said first hollow tubular pipe means being spaced from said bottom closure structure a lesser distance than said spaced distance of said electrical conductor means is spaced from said bottom closure structure.

5. The fuel monitoring system as recited in claim 2, wherein said means for maintaining said negative pressure on said fuel containing said contaminates within said separating means is a negative pressure type fuel pump of said negative pressure type fuel supply means of said automotive type system.

6. The fuel monitoring system as recited in claim 4, wherein said electrical circuit system is connected to said electrical conductor means of said sensing means, said electrical circuit system consisting of a plurality of electrical harness means, each said electrical harness means having a mating connector plug means on the end thereof that connects to a mating connector socket means on an adjacent electrical harness means, a first electrical harness means of said plurality of electrical harness means being a pigtail type having one end thereof without a connector plug or socket means which end is connected to elements of said readout means, a second electrical harness means of said plurality of electrical harness means being a pigtail type having one end thereof without a connector plug or socket means which end has an electrical lead connected to said electrical conductor means of said sensing means and two electrical leads connected to said suction type disposal mens, a third electrical harness means of said plurality of electrical harness means being a pigtail type having one end without a connector plug or socket means which end is connected to a logic circuits structure in which one element is a transformer which provides an alternating current for said electrical conductor means of said sensing means through said plurality of electrical harness means, a fourth electrical harness means of said plurality of electrical harness means being a pigtail type having one end thereof without a connector plug means which end is also connected to said logic circuits structure, a fifth electrical harness means of said plurality of electrical harness means, said fifth electrical harness means being a connecting means between said first and said fourth electrical harness means and additionally having two separate electrical leads therefrom connected to the power source of said automotive type system, and a sixth electrical harness means of said plurality of electrical harness means, said sixth electrical harness means being a connecting means between said second and said third electrical harness means.

7. The fuel monitoring system as recited in claim 2, wherein said readout means consists of a console having a visual light means to signal that said fuel monitoring system is on for operation, a visual light system to signal operation of said disposal means, an audible alarm means to signal operation of said disposal means, said audible alarm means having a switch means whereby said audible alarm means may be silenced, a switch means to test operation of said fuel monitoring system, said test operation concurrently purging any accumulated contaminates from said fuel monitoring system, and a fuse means, said fuse means protecting the electrical elements of said fuel monitoring system, said console having a pivotable mounting bracket for mounting said console in a plurality of positions for viewing after mounting.

8. The fuel monitoring system as recited in claim 4, wherein said suction type disposal means consists of said first hollow tubular pipe means and additionally, a second hollow tubular pipe means, said second hollow tubular pipe means being connected to said first tubular pipe means and communicating internally therewith, a suction type pump means, said suction type pump means being connected to the distal end of said second hollow tubular pipe means, said suction type pump means providing a suction through said first and second hollow tubular pipe means, a third hollow tubular pipe means, said third hollow tubular pipe means being connected to the discharge side of said suction type pump means and communicating internally therewith, a solenoid valve means, said solenoid valve means being connected to the distal end of said third hollow tubular pipe means and communicating internally therewith, and a fourth hollow tubular pipe means, said fourth hollow tubular pipe means being connected to the outboard side of said solenoid valve and communicating internally therewith, the distal end of said fourth hollow tubular pipe means being internally discharged into an environmentally suitable container.

9. The fuel monitoring system as recited in claim 3, wherein said hollow cylindrical body means is transparent for observation of said fuel and said accumulated contaminates therein.

10. The fuel monitoring system as recited in claim 3, wherein said separating means is suitably mounted by a reversible type bracket means, said bracket being capable of being mounted for both left and right installation.

11. The fuel monitoring system as recited in claim 3, and additionally, a petcock type valve means, said petcock type valve means being installed in said bottom closure structure and communicating with the interior of said hollow cylindrical body means.

* * * * *